Joseph Dugan

May 15, 1934.  J. DUGAN  1,959,264
RADIO DIRECTION AND POSITION INDICATING SYSTEM
Filed March 15, 1930   2 Sheets-Sheet 2

Joseph Dugan

Patented May 15, 1934

1,959,264

UNITED STATES PATENT OFFICE 1,959,264

RADIO DIRECTION AND POSITION INDICATING SYSTEM

Joseph Dugan, Los Angeles, Calif.

Application March 15, 1930, Serial No. 436,157

12 Claims. (Cl. 250—11)

The invention forming the subject matter of this application is a system of direction and position finding peculiarly adapted for use on air craft, and other vehicles, to direct them automatically in straight-line, drift corrected, movement toward or away from a radio beacon.

The invention is particularly designed and intended to guide aircraft in night flying and through fog in straight-line, drift corrected movement either in straight line alinement with two radio beacons, or along a straight line between two of such beacons. In addition to this, the system is designed for automatically indicating the precise location of an aircraft on a straight line passing through at least two radio beacons, which are preferably non-directional.

This application is a continuation in part of application, Serial No. 311,868, filed October 11, 1928, for Synchronous bomb sight, which matured into Patent No. 1,800,931, April 14, 1931. The subject matter disclosed herein and in application, Serial No. 311,868, as filed, comprises a pilot directing system by means of which a vehicle may be directed in straight line drift corrected movement in alinement with or between two spaced apart objects by means of a pilot director having two indicators controlled by two direction finders trained on said objects. This subject matter also includes a follow up system for converting the feeble rotary movements of the pointers of delicate measuring instruments, such as galvanometers, air speed meters, etc., into directed powerful movements to be applied wherever resistance is to be overcome.

Other objects of the invention will become apparent as the detailed description thereof proceeds.

Figure 1:
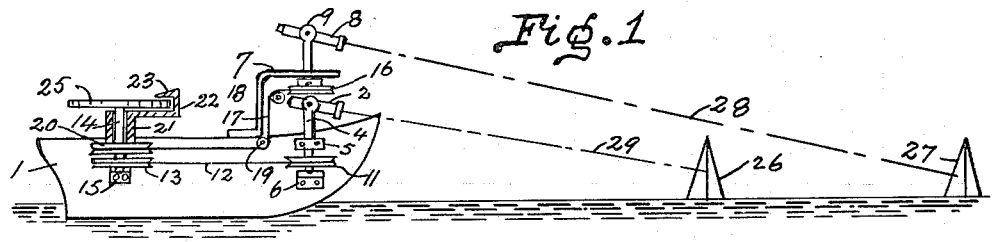
Fig. 1 is a diagram, in elevation, of a craft provided with two telescopes or direction finders adapted to be trained on two beacons or other objects for the purpose of steering the craft in straight line, drift corrected movement in alinement with the said objects, or in straight line movement between said objects.

In Fig. 1, there is illustrated a craft 1 having a telescope 2 mounted to rotate about a horizontal axis on a standard 4, which is suitably supported by the bracket 6 to rotate in azimuth about a substantially vertical axis. On a bracket 7, a second telescope is mounted to rotate about a horizontal axis on the standard 10, mounted to rotate in azimuth on the bracket 7 about the same axis as that of the standard 4.

The standard 4 has a grooved pulley 11 fixed thereto; and a cable 12 passes around this pulley 11 and a second similar pulley 13 fixed to a dial supporting shaft 14 mounted to rotate on bracket 15 about a substantially vertical axis. The standard 10 has a grooved pulley 16 fixed thereto; and a cable 17 passes around the groove of this pulley 16, over the guider pulleys 18 and 19, to and around the similarly grooved pulley 20.

The pulley 20 rotates freely on the shaft 14 and is provided with a hub 21, having an arm 22 extending radially therefrom and upturned to form an indicator 23 adapted to be alined with the indicator arrow 24 (see Figs. 2 and 3) formed on the dial 25 which is suitably secured to the upper end of the shaft 14.

It will be apparent from Fig. 1 that the azimuth rotations of the telescope 2 will rotate the dial 25 in synchronism therewith; and, that the similar rotations of the telescope 8 will likewise rotate the indicator 23 over the dial 25.

In the use of the invention, it is intended that one of the telescopes 2 or 8 shall be held trained on the beacon or object 26, while the other telescope will be held trained on the other beacon or object 27. It is the primary object of the invention to direct the craft 1 into straight line drift-corrected movement either in alinement with, but outside of, the said two beacons or objects, or in straight line drift-corrected movement between the said beacon or objects.

Figure 2:
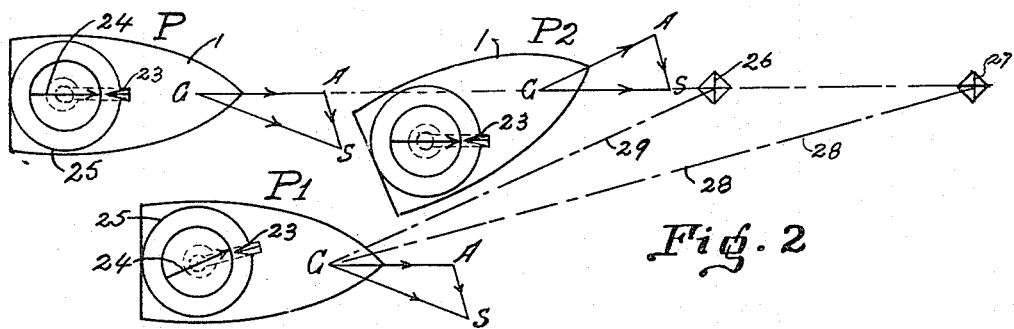
Fig. 2 is a diagram, in plan, of a craft being steered in the required straight-line movement in alinement with two beacons or similar objects.
Figure 3:
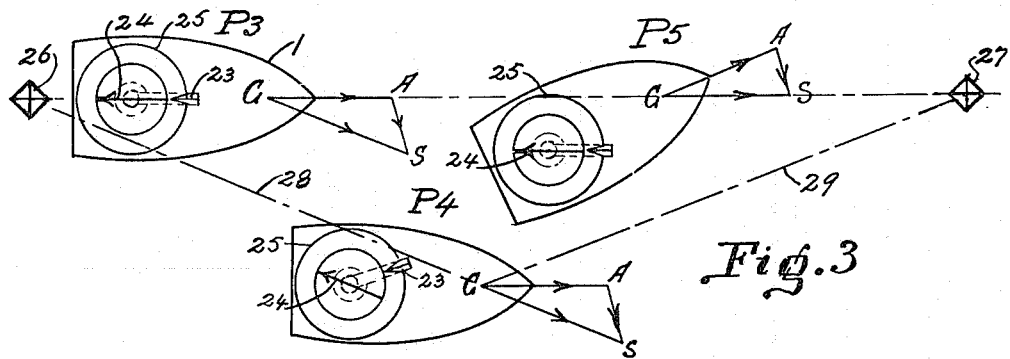
Fig. 3 is a similar diagram, in plan, illustrating the method of steering a craft in straight-line drift corrected movement between two of such objects or beacons.

Referring now to Figs. 2 and 3, let it be assumed that the common vertical axis of the telescopes 2 and 8 passes through the point G. Let it be assumed that the craft 1, which may be an aircraft, is moving at an airspeed represented by the vector GA; and, that a cross wind, represented by the vector AS, acts to cause a lateral movement of the craft from its compass course. Under these conditions, it will be obvious that the vector GS will represent the ground speed of the craft.

The telescopes are not shown in these figures of the drawings.

Referring now to Fig. 2, the craft 1 is shown in the position P, with its keel line in alinement with the straight line x passing through the beacons 26 and 27. If the craft be held to its compass course, the wind current AS will eventually move the craft to some such position as P1. If, in this new position P1, the telescopes be trained on the beacons 26 and 27, the indicator 23 and arrow 24 of the dial 25 will be angularly separated by the angle between the lines of sight 28 and 29 of the trained telescopes. It is assumed, of course, that the indicator 23 is initially fixed so that the radial line from the indicator to the axis of shaft 14 is parallel to the vertical plane of sight of the telescope 8; while the line 24 is constantly parallel to vertical plane of sight of the telescope 2.

This angular separation of the indicator 23 and line 24 indicates to the pilot that his craft is off course to the right of the line joining the two beacons 26 and 27, and that he must steer to the left in order to return to this line. By steering to the left, the pilot will eventually arrive at the position P2 in which his craft is moving along, but at an angle (of drift) thereto, the straight line joining the beacons 26 and 27; and will continue to move in this manner (corrected for drift) so long as the indicator 23 registers with the arrow 24.

Fig. 3 illustrates the method of steering the craft into straight line drift-corrected movement betweens the beacons 26 and 27. In this case the telescope 8 must be turned in the direction opposite to that of the telescope 2. This movement of the telescope 8 reverses the dial 25, and the indicator 23 will then register with the tail of the arrow 24. The steering operation is similar to that already described, and will be obvious from inspection of Fig. 3.

Figure 6:
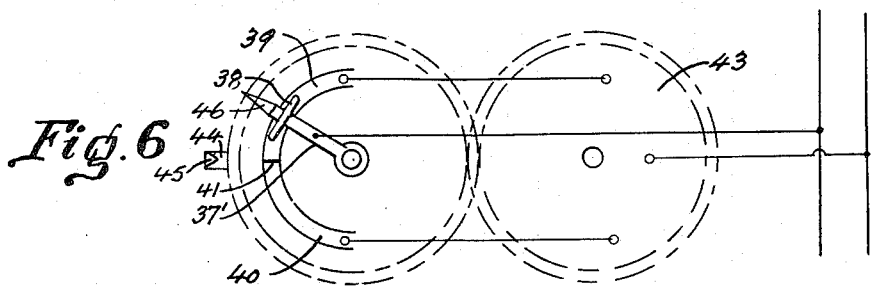
Fig. 6 is a wiring diagram.
Figures 4, 5:
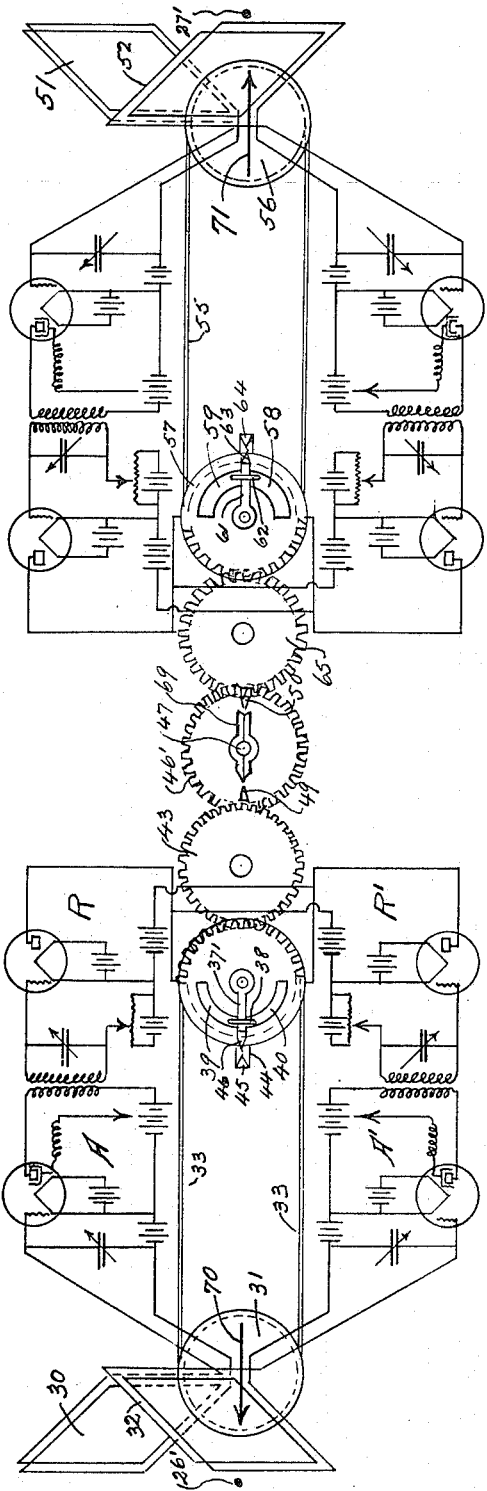
Fig. 4 is a diagram showing two pairs of loop antennæ adapted to be substituted for the telescopes of Fig. 1.
Fig. 5 is a side elevation of the apparatus shown in Fig. 4, parts of the direction indicating mechanism being broken away and shown in section.

Coming, now, to the invention disclosed in Figs. 4, 5 and 6, attention is directed to the fact that two pairs of loop antennæ are substituted for the two telescopes of Figs. 1 to 3. Each pair of loops acts a sort of radio telescope which is automatically held trained on a radio beacon by energy derived from that beacon.

As shown in Figs. 4 and 5, a loop antenna 30 is fixed vertically to a pulley sheave 31; and a second loop 32 is similarly fixed to the same sheave 31. These two loop antennæ are insulated from each other, and are secured to said sheave 32 at a fixed angle to each other. A cable 33 passes around the groove of the pulley 31, and around the groove of a similar pulley 34 (see Fig. 5) fixed to a spur gear 35 which is mounted to rotate freely with said pulley 34 about the indicator shaft 36 of a galvanometer 37.

The gear 35 takes the place of the usual galvanometer dial and has a two part commutator insulated from and fixed to the upper face of the said gear. A conductor arm 37' extends radially from the shaft 36, and has a small conductor trolley wheel 38 rotatably mounted thereon to roll in electrical contact with the commutator segments 39 and 40 (see Fig. 6) the adjacent ends of which are separated from each other by the insulator strip 41.

A follow-up motor 42 has a spur gear 43 fixed to its shaft and in mesh with the gear 35, and causes the gear 35 to follow-up the indicator arm 37, in order to maintain the gear 35 with its insulator strip 41 centered under the trolley wheel 38. In performing this function, the motor 42, through the pulley sheaves 31 and 34 and the cable 33, automatically rotates the loop antennæ so that a line from the radio beacon 26' constantly bisects the angle between the two antennæ.

In order to effect this automatic rotation of the two loop antennæ, each loop is separately connected through an amplifier and rectifier to the galvanometer 37 in such manner that the separate amplified and rectified currents buck each other, and the arm 37' is swung on to one or the other of the segments 39 and 40, according to which of the loop circuits is most strongly energized.

The loop 30 is connected through the amplifier A and rectifier B to the galvanometer 37; and the loop 32 is likewise connected through the amplifier A' and rectifier B' to the said galvanometer. The characteristics of the separate loop circuits are identical, and the several elements thereof are adjustable to secure exact balance between the currents generated in the two loops when the latter are directed toward a radio beacon or broadcasting station in such manner that a line from the station bisects the angle between the two antennæ.

The structural details of the loops, amplifiers and rectifiers form no part of the present invention, and may be varied as found convenient or desirable; and any desired number of stages of amplification may be used in the r. f. or rectified circuits.

In order to facilitate initial balancing of the separate loop circuits, the galvanometer has an arm 44 secured to the casing thereof and extending upwardly to provide an index 45 (Fig. 6) adapted to cooperate with a pointer 46 formed on the outer end of the arm 37' to indicate balance, or lack of balance, between the currents in the opposed loop circuits. The various controls of the amplifiers and rectifiers must be initially adjusted to cause the pointer 46 to register with the index 45 when the loops are directed toward a transmitting station so that a line drawn from the station bisects the fixed angle between the two loops. The controls are then locked in adjusted position.

The gear 43 of the follow-up motor 42 also meshes with a gear 46' which is mounted to rotate about an indicator shaft 47 of the pilot director 48. This gear 46' has a pair of index plates 49 and 50 fixed to the upper face thereof, and located diametrically opposite each other to correspond, in function, to the arrow 24 of the indicator dial 25 (shown in diagrammatic figures 2 and 3). These index plates 49 and 50 are alined with each other, and are always parallel to the conductor arm 37' of the galvanometer 37 and to the line from the transmitter beacon bisecting the angle between the loops 30 and 32. This will be obvious from inspection of the gearing arrangement shown in Figs. 4 and 5.

The radio structure, so far described, constitutes one unit of the direction finder system. The other unit is shown to the right of the shaft 47 (Figs. 4 and 5). This other unit comprises the relatively fixed loops 51 and 52, insulated from each other and connected by the oppositely balanced amplifiers and rectifiers to the galvanometer 53, which is substantially the same as the galvanometer 37.

A pulley sheave 54 rotatably mounted on the casing of the galvanometer 53 has a cable 55 passed around it and around a similar pulley sheave 56 which supports the loops 51 and 52 for rotation about the substantially vertical axis of the sheave 56. A gear 57 is fixed to the sheave 54 and is provided with commutator segments 58 and 59, similar to the segments 39 and 40 of the galvanometer 37. These segments 58 and 59 are insulated from the gear 57 and have their adjacent ends separated from each other by an insulating strip similar to the strip 41 shown in Fig. 6.

The galvanometer shaft 60 (around which the gear 57 and sheave 54 rotate freely) carries a radial conductor arm 61 at its upper end; and the arm 61 supports a conductor trolley wheel 62 in rolling contact with the segments 58 and 59 and the central insulator strip. A pointer 63 on the end of the arm 61 cooperates with an index 64 fixed to the casing of the galvanometer 53 in order to facilitate the initial balancing adjustments of the separate amplifying and rectifying circuits of the loops 51 and 52.

The gear 57 meshes with the gear 65 of the follow-up motor 66 and also with the gear 67 of the pilot director 48. The gear 67 is rotatably supported on the bracket 68 and is fixed to the indicator shaft 47 which carries the indicator 69 at its upper end. The pointer 69 is always parallel to the galvanometer arm 61 and to a line bisecting the fixed angle between the loops 51 and 52.

The circuits of the loops 51 and 52 are balanced in the same manner as the loops 30 and 32; and the balancing controls are locked in adjusted positions after balance is secured. The two pairs of loops are tuned to the different frequencies of the radio beacons 26' and 27', and the apparatus is ready for use, either to keep the craft alined with two beacons, as shown in Fig. 2, or to keep it in straight line drift-corrected movement, as shown in Fig. 3. By steering the craft to keep the pointer 69 alined with the indicator plates 49 and 50, the pilot can be assured that the craft is moving in straight line drift-corrected movement in alinement with the two beacons for which the direction finding apparatus is set.

The pilot director of this apparatus is an instrument completely independent of the radio receiver; that is, no part or parts of any of the receivers constitute an element or elements of the pilot director. The follow-up motors 42 and 46 are also instruments which constitute no part of the radio receiver but are elements in addition thereto. Therefore, in the claims appended to this application every element set forth therein is to be considered as complete in itself and not as including parts of other elements set forth separately in the claims.

The apparatus can very readily be adapted to indicate the position of the craft along the line of travel by using a third pair of loops and balanced radio systems directed toward a third radio beacon laterally displaced with respect to the said line of travel. This would necessitate an additional pointer for pilot indicator, concentric with the pointer 69 and reading on indications on the face of the gear 46 corresponding to the angular direction of the third beacon at any point on the line of travel of the craft.

While I have referred to the members 42 and 66 as "galvanometers", it must be understood that this is merely for convenience of description, and not by way of limitation, since any suitable instrument for performing the loop controlling functions may be substituted therefor. This also applies to the specific details of the follow-up motor and the pilot director, as these can be varied indefinitely without departing in any way from the spirit of the invention.

The pulley sheaves 31 and 56 are provided with pointers or indicators 70 and 71, respectively, which bisect the angles between the respective pairs of loop antennæ 30 and 32 and 51 and 52. These pointers are therefore held in positions pointing directly toward the stations controlling their respective pairs of loops. Each pair of loops, therefore, operates as an automatic indicator which constantly points toward the transmitting station controlling the indicator elements.

The invention is not to be considered as limited to the use of two or three loop units in combination with two or three radio beacons, as any single unit can be used for steering a craft in straight line drift-corrected movement toward the beacon for which it is tuned. When one beacon and loop unit are used alone, the index 45 may be considered as a lubber mark and the craft must be steered in one direction or the other until the dial or gear 35 becomes stationary relative to this lubber mark. This method of steering involves nothing more than the principle of constant bearing, and is fully described in my British Patent, 161,784 April 21, 1921.

It must be understood that the pilot directing part of the apparatus will be mounted on the aircraft or other vehicle in any convenient position. While the loop antennæ indicators are compelled to point in the direction of the beacons, the central pilot director including the dial gear 46' and the indicators 47, 49 and 50 may be mounted in any convenient location or angular position suitable for observation by the pilot. It is necessary to mount this indicator pilot directing mechanism, in all cases, so that the indicator pointers will be in alinement or registry with each other only when the beacons or objects are "in transit" with the vehicle.

What I claim is:—

1. Radio transmitters of different frequencies; a vehicle; radio receivers mounted on said vehicle and equal in number to the number of said transmitters, each of said receivers including an antenna structure rotatable on said vehicle and responsive only to a particular one of said transmitters; a pilot director fixed to said vehicle and having indicators rotatable thereon, said indicators being equal in number to the number of said transmitters, means for operably connecting each of said indicators to the antenna structure of only one of said receivers; said means being energized independently of energy derived from said transmitters and controlled by energy derived from said transmitters through the receivers responsive thereto for simultaneously rotating said antenna structure and indicators to hold said indicators constantly in the same angular relation to each other throughout the movements of the vehicle as the angular relation between vertical planes passing through said vehicle and transmitters.

2. Radio transmitters of different frequencies; a vehicle; radio receivers mounted on said vehicle and equal in number to the number of said transmitters, each of said receivers including an antenna structure rotatable on said vehicle and responsive only to a particular one of said transmitters; a pilot director fixed to said vehicle and having indicators rotatable thereon, said indicators being equal in number to the number of said transmitters; means, each including a follow-up motor, operably connecting one of the indicators to the antenna structure of only one of said receivers; independent means for energizing each of said motors; and means operated by energy derived from said transmitters through the receivers responsive thereto to control the operation of said independent means, said indicators and antenna structures being arranged to be maintained constantly by said motors in the same angular relation to each other as the angular relation between vertical planes passing through said vehicle and transmitters.

3. In a direction finding system, a vehicle, two direction determining devices, each rotatable about a normally vertical axis on said vehicle, a pilot director including two indicators rotatable on said vehicle, means for transmitting the rotation of one of said devices to one of said indicators, means for transmitting the rotation of the other device to the other indicator, said indicators being mounted on said vehicle to align substantially with each other only when the lines of direction of said devices lie in substantially the same plane.

4. In a direction finding system, a vehicle, two direction determining devices, each rotatable about a normally vertical axis on said vehicle, a pilot director including two indicators rotatable about a common axis on said vehicle, means for transmitting the rotation of one of said devices to one of said indicators, means for transmitting the rotation of the other device to the other indicator, said indicators being mounted on said vehicle to align substantially with each other only when the lines of direction of said devices lie in substantially the same plane.

5. A radio transmitter, a support, a radio receiver responsive to said transmitter and including a directional antenna rotatable about a normally vertical axis on said support, a circuit closer including two relatively movable members movably mounted on said support and one of which members is operable by energy derived from said transmitter through said receiver, a motor operable by energy independent of energy derived from said transmitter and controlled in operation by the relative movements of said members, and means separate from said receiver and operated by said motor to indicate the direction of the transmitter from said receiver.

6. A radio transmitter; a vehicle; a radio receiver responsive to said transmitter and including a directional antenna rotatable about a normally vertical axis on said vehicle; a pilot director separate from said receiver and including an indicator rotatable on said vehicle; mechanism for rotating said antenna and indicator in synchronism; said mechanism including a follow-up motor and independent means for energizing said motor; and a circuit closer operable by energy derived from said transmitter through said receiver to control application of said means to said motor.

7. A radio transmitter; a vehicle; a radio receiver responsive to said transmitter and including a directional antenna rotatable about a normally vertical axis on said vehicle; an electrical measuring instrument including a pointer movable in opposite directions relative to said vehicle by energy derived from said transmitter through said receiver; means controlled by the movements of said pointer to rotate said antenna in accordance with said movement to hold the antenna continuously directed toward said transmitter throughout all substantially horizontal angular movements of the vehicle with respect to a vertical plane passing through the transmitter and vehicle and a pilot director separate from said receiver and operated by said means to indicate the direction of the transmitter from the said receiver.

8. The combination with the structure set forth in claim 7 of an index fixed to said vehicle and cooperating with said pointer to indicate the horizontal angle between the heading of said vehicle and the said vertical plane.

9. In a direction finding system, a vehicle, two sighting devices each rotatable about a normally vertical axis on said vehicle, a pilot director including two indicators rotatable on said vehicle, means for transmitting the rotation of one of said devices to one of said indicators, means for transmitting the rotation of the other sighting device to the other indicator, said indicators being mounted to aline with each other only when the lines of sight of said two devices lie in substantially the same vertical plane.

10. In a direction finding system, a vehicle, two sighting devices, each rotatable about a normally vertical axis on said vehicle, a pilot director including two indicators rotatable about a common fixed axis on said vehicle, means for transmitting the rotation of one of said devices to one of said indicators, means for transmitting the rotation of the other sighting device to the other indicator, said indicators being mounted on said vehicle to aline substantially with each other only when the lines of sight of said two devices lie in substantially the same vertical plane.

11. In a direction finding system, a vehicle, two sighting devices, each rotatable about a normally horizontal and a normally vertical axis on said vehicle, a pilot director including two indicators rotatable on said vehicle, means for transmitting the rotation of one of said devices about its normally vertical axis to one of said indicators, means for transmitting the rotation of the other sighting device about its normally vertical axis to the other indicator, said indicators being mounted to aline with each other only when the lines of sight of said two devices lie in substantially the same vertical plane.

12. In a direction finding system, a vehicle, two sighting devices, each rotatable about a normally horizontal axis and about a normally vertical axis on said vehicle, a pilot director including two indicators rotatable about a common axis fixed on said vehicle, means for transmitting the rotation of one of said devices about its normally vertical axis to one of said indicators, means for transmitting the rotation of the other device about its normally vertical axis to the other indicator, said indicators being mounted to aline with each other only when the lines of sight of the two devices lie in substantially the same vertical plane.

JOSEPH DUGAN.